(12) United States Patent
Suita

(10) Patent No.: US 11,338,624 B2
(45) Date of Patent: May 24, 2022

(54) TIRE AND TIRE MANUFACTURING METHOD

(71) Applicant: Toyo Tire Corporation, Itami (JP)

(72) Inventor: Harunobu Suita, Itami (JP)

(73) Assignee: Toyo Tire Corporation, Itami (JP)

( * ) Notice: Subject to any disclaimer, the term of this patent is extended or adjusted under 35 U.S.C. 154(b) by 102 days.

(21) Appl. No.: 16/722,526

(22) Filed: Dec. 20, 2019

(65) Prior Publication Data

US 2020/0207160 A1  Jul. 2, 2020

(30) Foreign Application Priority Data

Dec. 26, 2018  (JP) .............................. JP2018-243521

(51) Int. Cl.
| | | |
|---|---|---|
| *B60C 19/00* | (2006.01) | |
| *B29D 30/00* | (2006.01) | |
| *B60C 15/06* | (2006.01) | |

(52) U.S. Cl.
CPC .......... *B60C 19/00* (2013.01); *B29D 30/0061* (2013.01); *B60C 15/06* (2013.01); *B29D 2030/0077* (2013.01); *B60C 2015/0621* (2013.01); *B60C 2015/0625* (2013.01); *B60C 2019/004* (2013.01)

(58) Field of Classification Search
CPC ...................................................... B60C 19/00
See application file for complete search history.

(56) References Cited

U.S. PATENT DOCUMENTS

| 8,977,422 B1 | 3/2015 | Westfall | |
|---|---|---|---|
| 2008/0192451 A1 | 8/2008 | Sinnett et al. | |
| 2008/0289736 A1* | 11/2008 | Adamson | B60C 23/0493 152/152.1 |
| 2015/0047782 A1* | 2/2015 | Hotaling | B60C 23/0493 156/307.3 |
| 2019/0322142 A1 | 10/2019 | Lallement et al. | |
| 2020/0079159 A1* | 3/2020 | Destraves | H04W 4/80 |

FOREIGN PATENT DOCUMENTS

| CN | 101279574 A | 10/2008 |
|---|---|---|
| FR | 3059603 A1 | 6/2018 |
| JP | 2007-230261 A | 9/2007 |
| JP | 2008-536357 A | 9/2008 |

(Continued)

OTHER PUBLICATIONS

Machine Translation: KR-20100120505-A, Jeong Jae Yeong, (Year: 2021).*

(Continued)

*Primary Examiner* — Kendra Ly
(74) *Attorney, Agent, or Firm* — Maier & Maier, PLLC

(57) ABSTRACT

A tire includes: a bead core; a bead filler which extends to an outer side in the tire-radial direction of the bead core; a carcass ply which extends from the bead core to another bead core, and folded back around the bead core; a first rubber sheet which covers a folding end of the carcass ply folded back from an inner side in the tire-width direction; and a second rubber sheet which covers the folding end of the carcass ply folded back from an outer side in the tire-width direction, in which an electronic component is provided between the first rubber sheet and the second rubber sheet.

8 Claims, 10 Drawing Sheets

(56) References Cited

FOREIGN PATENT DOCUMENTS

| JP | 2008-265750 A | | 11/2008 |
|---|---|---|---|
| JP | 2012006451 A | * | 1/2012 |
| KR | 20100120505 A | * | 11/2010 |
| KR | 20100120505 A | | 11/2010 |
| WO | 2011002440 A1 | | 1/2011 |
| WO | 2015/088890 A1 | | 6/2015 |

OTHER PUBLICATIONS

Machine Translation: JP-2012006451-A, Ikejiri, Naoto (Year: 2021).*
Japanese Office Action dated Dec. 3, 2019 in corresponding Japanese Application No. 2018-243521; 6 pages; Partial machine translation attached.
Extended European Search Report dated Mar. 30, 2020, in corresponding European application No. 19217362.3; 7 pages.

* cited by examiner

TIRE AND TIRE MANUFACTURING METHOD

CROSS-REFERENCE TO RELATED APPLICATIONS

This application is based on and claims the benefit of priority from Japanese Patent Application No. 2018-243521, filed on 26 Dec. 2018, the content of which is incorporated herein by reference.

FIELD

The present invention relates to a tire in which an electronic component is embedded.

BACKGROUND

Conventionally, tires in which an electric component such as RFID is embedded within the rubber structure have been known. With such tires, by an RFID tag embedded in the tire and a reader as an external device carrying out communication, it is possible to perform production control of tires, usage history management, etc. For example, Japanese Unexamined Patent Application, Publication No. 2008-265750 shows a tire in which an electronic component is arranged at the boundary surface of two difference substances. The boundary surface of two substances at which this electronic component is arranged is a surface extending from a free edge of a carcass ply.

SUMMARY

With the technology shown in Patent Document 1, the boundary surface between two substances at which the electronic component is arranged becomes a surface extending from a free edge of the carcass ply; however, at this portion, stress and distortion tends to occur upon the tire deforming. Therefore, the electronic portion arranged at this portion is affected by the stress and distortion upon the tire deforming, and there is a possibility of no longer maintaining the function as an electronic component.

The present invention has been made taking account of the above-mentioned problem, and an object thereof is to provide a tire which can maintain the function of an embedded electronic component, by arranging the electronic component at a position which is hardly affected by the stress and distortion within the tire structure.

A tire (for example, the tire 1) according to a first aspect of the present invention includes: a bead core (for example, the bead core 21); a bead filler (for example, the bead filler 22) which extends to an outer side in a tire-radial of the bead core; a carcass ply (for example, the carcass ply 23) which extends from the bead core to another bead core, and is folded back around the bead core; a first rubber sheet (for example, the first rubber sheet 37) covering a folding end (for example, the folding end 25A) of the carcass ply which has been folded back from an inner side in the tire-width direction; and a second rubber sheet covering a folding end of the carcass ply which has been folded back from an outer side in the tire-width direction, in which an electronic component (for example, the RFID tag 40) is provided between the first rubber sheet and the second rubber sheet.

According to a second aspect of the present invention, in the tire as described in the first aspect, the first rubber sheet and the second rubber sheet may both be formed in an annular shape, and the first rubber sheet and the second rubber sheet of annular shape may cover the folding end (for example, the folding end 25A) of the carcass ply over an entire circumference thereof.

According to a third aspect of the present invention, in the tire as described in the second aspect, the bead filler may be formed in an annular shape, and outer circumferential edge parts (For example, 22A, 37A, 47A in FIG. 6) of the first rubber sheet of annular shape, the second rubber sheet of annular shape and the bead filler of annular shape may substantially match.

According to a fourth aspect of the present invention, in the tire as described in any one of the first to third aspects, the electronic component may be covered by a coating rubber sheet (for example, the coating rubber sheets 431, 432), and the electronic component covered by the coating rubber sheet may be disposed between the first rubber sheet and the second rubber sheet.

According to a fifth aspect of the present invention, in the tire as described in any one of the first to third aspects, the electronic component in an uncoated state may be disposed between the first rubber sheet and the second rubber sheet.

According to a sixth aspect of the present invention, in the tire as described in any one of the first to fifth aspects, a modulus of the first rubber sheet and the second rubber sheet may be equal to or higher than a modulus of a rubber member (for example, the pad member 34, second bead filler 222) covering a circumference of the first rubber sheet and the second rubber sheet.

According to a seventh aspect of the present invention, in the tire as described in the fourth aspect, a modulus of the coating rubber sheet may be lower than modulus of the first rubber sheet and the second rubber sheet.

According to an eighth aspect of the present invention, in the tire as described in any one of the first to seventh aspects, the first rubber sheet and the second rubber sheet each may include an interior layer (for example, the interior layer 371, 471) on a side facing the electronic component and an outer layer (for example, the outer layer 372, 472) positioned on a side further distanced from the electronic component than the interior layer, and a modulus of the interior layer may be lower than a modulus of the outer layer.

According to a ninth aspect of the present invention, in the tire as described in any one of the first to eighth aspects, when defining a distance in a tire-width direction cross-sectional view from a tire-radial direction outside end of the bead filler until a folding end of the carcass ply which is folded back as a reference distance (for example, the reference distance R), the electronic component may be disposed in a region (for example, the region Q) from the position of a tire-radial direction outside end of the bead filler until a position (for example, the position P) 60% of the reference distance towards the inner side in the tire-radial direction.

According to a tenth aspect of the present invention, a method of manufacturing the tire as described in any one of the first to ninth aspects includes the steps of: pasting the first rubber sheet to the bead filler; and overlapping the first rubber sheet and the second rubber sheet, in which the electronic component may be pasted to the first rubber sheet or the second rubber sheet, prior to the step of overlapping, and the electronic component may be interposed by the first rubber sheet and the second rubber sheet in the step of overlapping.

According to an eleventh aspect of the present invention, in a method of manufacturing the tire as described in the tenth aspect, wherein the electronic component may have a spring antenna (for example, the spring antenna 421), the method may include a step of disposing rubber (for example, the rubber 46) inside the spring antenna, and the electronic component having a spring antenna in which the rubber was disposed may be interposed by the first rubber sheet and the second rubber sheet in the step of overlapping.

According to the present invention, it is possible to provide a tire which can maintain the function of an embedded electronic component, by arranging the electronic component at a position which is hardly affected by the stress and distortion within the tire structure.

DETAILED DESCRIPTION

First Embodiment

Figure 1:
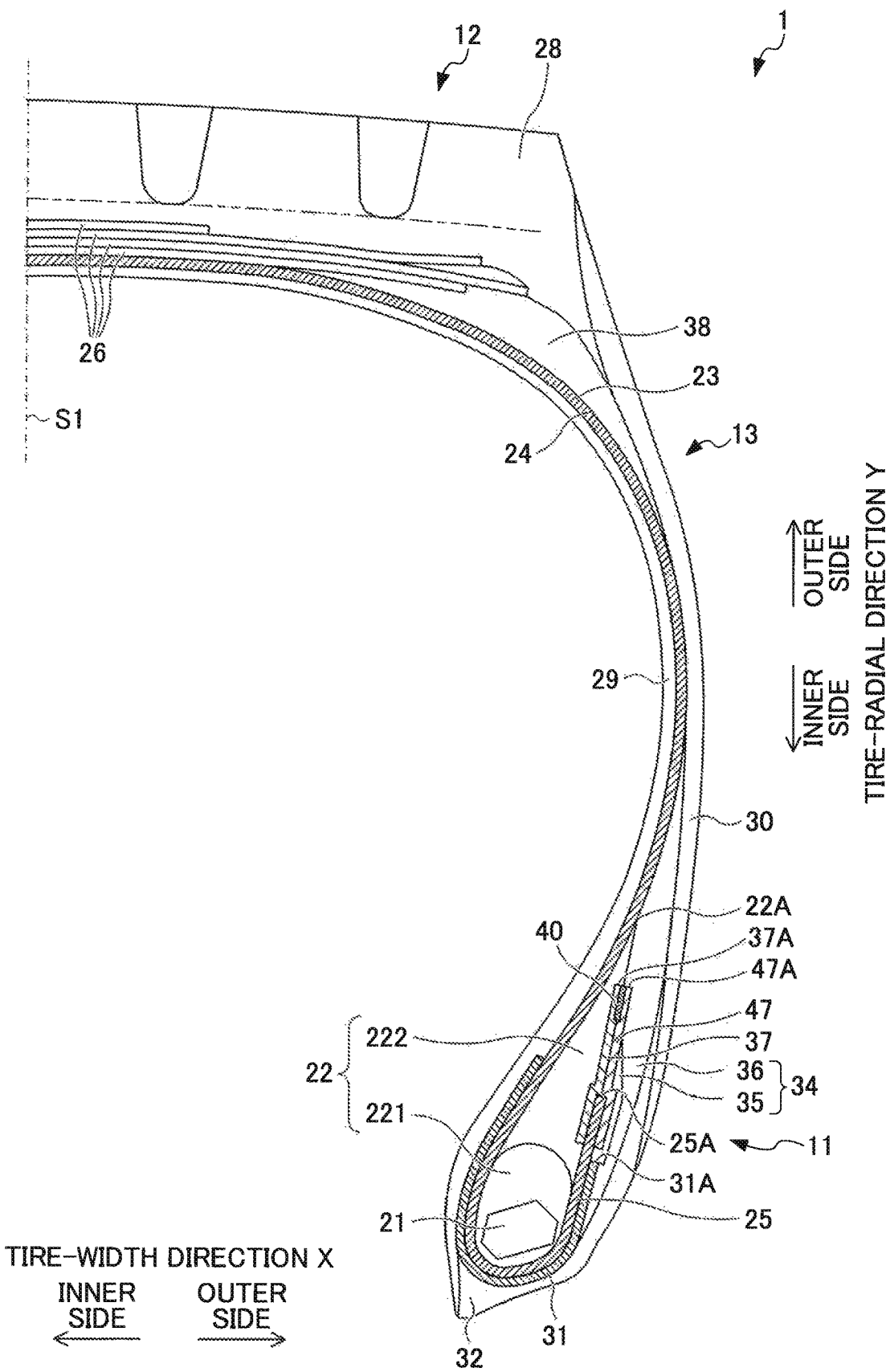
FIG. 1 is a view showing a half section in a tire-width direction of a tire according to a first embodiment of the present invention.

Hereinafter, a first embodiment of the present invention will be explained while referencing the drawings. FIG. 1 is a view showing a half section in a tire-width direction of a tire 1 according to the present embodiment. The basic structure of the tire is left/right symmetric in the cross section of the tire-width direction; therefore, a cross-sectional view of the right half is shown herein. In the drawings, the reference symbol S1 is the tire equatorial plane. The tire equatorial plane S1 is a plane orthogonal to the tire rotation axis, and is positioned in the center of the tire-width direction. Herein, tire-width direction is a direction parallel to the tire rotation axis, and is the left/right direction of the paper plane of the cross-sectional view in FIG. 1. In FIG. 1, it is illustrated as the tire-width direction X. Then, inner-side of tire-width direction is a direction approaching the tire equatorial plane S1, and is the left side of the paper plane in FIG. 1. Outer side of tire-width direction is a direction distancing from the tire equatorial plane S1, and is the right side of the paper plane in FIG. 1. In addition, tire-radial direction is a direction perpendicular to the tire rotation axis, and is the vertical direction in the paper plane of FIG. 1. In FIG. 1, it is illustrated as the tire-radial direction Y. Then, outer-side of tire-radial direction is a direction distancing from the tire rotation axis, and is the upper side of the paper plane in FIG. 1. Inner-side of tire-radial direction is a direction approaching the tire rotation axis, and is the lower side of the paper plane in FIG. 1. The same also applies to FIGS. 2, 6 and 8.

The tire 1 is a tire for trucks and buses, for example, and includes a pair of beads 11 provided at both sides in the tire width direction, tread 12 forming a contact patch with the road surface, and a pair of sidewalls 13 which extends between the pair of beads and the tread 12.

The bead 11 includes an annular bead core 21 formed by wrapping around several times bead wires made of metal coated with rubber, and a bead filler 22 of tapered shape extending to the outer side in the tire-radial direction of the bead core 21. The bead filler 22 is configured by a first bead filler 221 which covers the outer circumference of the bead core 21, and a second bead filler 222 which is arranged on the outer side in the tire-radial direction of the first bead filler 221. The second bead filler 222 is configured from rubber with a modulus higher than an inner liner 29 and side wall rubber 30 described later. Then, the first bead filler 221 is configured from rubber of an even higher modulus than the second bead filler 222. It should be noted that the first bead filler 221 may be a form not covering the outer circumference of the bead core 21, if at least a part thereof is arranged on the outer side in the tire-radial direction of the bead core 21. In addition, the bead filler 22 may be formed from rubber of one type. In other words, it may not necessarily be divided into the first bead filler 221 and second bead filler 222. The bead core 21 is a member which plays a role of fixing a tire filled with air to the rim of a wheel which is not illustrated. The bead filler 22 is a member provided in order to raise the rigidity of the bead peripheral part and to ensure high maneuverability and stability.

A carcass ply 23 constituting a ply serving as the skeleton of the tire is embedded inside of the tire 1. The carcass ply 23 extends from one bead core to the other bead core. In other words, it is embedded in the tire 1 between the pair of bead cores 21, in a form passing through the pair of side walls 13 and the tread 12. As shown in FIG. 1, the carcass ply 23 includes a ply body 24 which extends from one bead core to the other bead core, and extends between the tread 12 and bead 11, and a ply folding part 25 which is folded around the bead core 21. Herein, a folding end 25A of the ply folding part 25 is positioned more to an inner side in the tire-radial direction than a tire-radial direction outside end 22A of the bead filler 22. The carcass ply 23 is configured by a plurality of ply cords extending in a tire-width direction. In addition, a plurality of ply cords is arranged side by side in a tire circumferential direction. This ply cord is configured by a metal steel cord, or an insulated organic fiber cord such as polyester or polyamide, or the like, and is covered by rubber.

In the tread 12, a plurality of layers of steel belts 26 is provided in the outer side in the tire radial direction of the carcass ply 23. The steel belt 26 is configured by a plurality of steel cords covered by rubber. By providing the steel belts 26, the rigidity of the tire is ensured, and the contact state of the road surface with the tread 12 improves. In the present embodiment, although four layers of steel belts 26 are provided, the number of layered steel belt 26 is not limited thereto.

The tread rubber 28 is provided at the outer side in the tire-radial direction of the steel belt 26. A tread pattern (not illustrated) is provided to the outer surface of the tread rubber 28, and this outer surface serves as a contact surface which contacts with the road surface.

In the vicinity of the outer side in the tire-width direction of the tread 12, in a region between the carcass ply 23, and the steel belts 26/tread rubber 28, a shoulder pad 38 is provided. This shoulder pad 38 extends until a region of the outer side in the tire-radial direction of the side wall 13, and part thereof forms an interface between side wall rubber 30 described later. In other words, in the region of the outer side in the tire-radial direction of the side wall 13, a part of the shoulder pad 38 is present on the inner side in the tire width direction of the side wall rubber 30. The shoulder pad 38 consists of a rubber member having cushioning, and exhibits a cushion function between the carcass ply 23 and steel belt 26. In addition, since the shoulder pad 38 consists of rubber having a characteristic of low heat buildup, it is possible to suppress heat generation effectively, by extending until the side wall 13.

In the side wall 13, the side wall rubber 30 constituting the outer wall surface of the tire 1 is provided to the outer side in the tire-width direction of the carcass ply 23. This side wall rubber 30 is a portion which bends the most upon the tire exhibiting a cushioning action, and usually flexible rubber having fatigue resistance is adopted therein.

In the side wall 13, the side wall rubber 30 constituting the outer wall surface of the tire 1 is provided to the outer side in the tire-width direction of the carcass ply 23. This side wall rubber 30 is a portion which bends the most upon the tire exhibiting a cushioning action, and usually flexible rubber having fatigue resistance is adopted therein.

On the inner side in the tire radial direction of the carcass ply 23 provided around the bead core 21 of the bead 11, a steel chafer 31 serving as a reinforcement ply is provided so as to cover at least part of the carcass ply 23. The steel chafer 31 also extends to the outer side in the tire-width direction of the ply folding part 25 of the carcass ply 23, and an end part 31A of this steel chafer 31 is positioned more to the inner side in the tire-width direction than the folding end 25A of the carcass ply 23. This steel chafer 31 is a metal reinforcement layer configured by metal steel cords, and is covered by rubber.

Rim strip rubber 32 is provided at the inner side in the tire-radial direction of the steel chafer 31. This rim strip rubber 32 is arranged along the outer surface of the tire, and connects with the side wall rubber 30. This rim strip rubber 32 and side wall rubber 30 are rubber members constituting the outer surface of the tire.

Then, at the outer side in the tire-radial direction of the end part 31A of the steel chafer 31, which is at the outer side in the tire-width direction of the folding part 25 of the carcass ply 23 and bead filler 22, a first pad 35 is provided. This first pad 35 is provided to the outer side in the tire-width direction of at least the folding end 25A of the carcass ply 23. The outer side in the tire-radial direction of the first pad 35 is formed so as to taper as approaching the outer side in the tire-radial direction.

Furthermore, a second pad 36 is provided so as to cover the outer side in the tire-width direction of the first pad 35. In more detail, the second pad 36 is provided so as to cover the outer side in the tire-width direction of part of the steel chafer 31, the first pad 35, part of the second bead filler 222, and part of the ply body 24 of the carcass ply 23. Then, the side-wall rubber 30 is arranged at the outer side in the tire-width direction in a region of the outer side in the tire-radial direction of the second pad 36, and the rim strip rubber 32 is arranged at an outer side in the tire-width direction in a region on the inner side in the tire-radial direction of the second pad 36. In other words, the second pad 36 is provided between the first pad 35, etc., and the rim strip rubber 32 and side wall rubber 30, which are members constituting the outer surface of the tire.

Herein, the first pad 35 and second pad 36 constitute the pad member 34, and this pad member 34 is configured by rubber of higher modulus than the modulus of the tire-radial direction outside portion of the bead filler 22 filler (second bead filler 222. In more detail, the second pad 36 is configured by rubber of higher modulus than the second bead filler 222, and the first pad 35 is configured by rubber of even higher modulus than the second pad 36. The first pad 35 and second pad 36 have a function of mitigating sudden distortion caused by the local rigidity point of change at the folding end 25A of the carcass ply 23 and the end part 31A of the steel chafer 31.

Between the bead filler 22 and the pad member 34, the first rubber sheet 37 and second rubber sheet 47 serving as reinforced rubber sheets are arranged in the vicinity of the folding end 25A of the carcass ply 23. In more detail, as shown in FIG. 1, the first rubber sheet 37 is arranged so as to cover the folding end 25A of the carcass ply 23 from the inner side in the tire-width direction. The second rubber sheet 47 is arranged so as to cover the folding end 25A of the carcass ply 23 from the outer side in the tire-width direction. Then, the first and second rubber sheets 37, 47 are pasted together in a region on the outer side in the tire-radial direction thereof. The modulus of the first and second rubber sheets 37, 47 is preferably a modulus of at least the modulus of the rubber member covering the surroundings.

Generally, at the folding end 25A of the carcass ply 23, stress tends to concentrate. However, by providing the first and second rubber sheets 37, 47 serving as the aforementioned reinforced rubber sheets, it becomes possible to effectively suppress the concentration of stress. It should be noted that, although the pad member 34 is configured from the first pad 35 and second pad 36 in the present embodiment, the pad member 34 may be configured from one member. However, as mentioned above, by configuring the pad member 34 from the first pad 35 and second pad 36, and further adopting a configuration arranging the first and second rubber sheets 37, 47, it is possible to more effectively suppress the concentration of stress.

It should be noted that the positions of the tire-radial direction outside ends 37A, 47A of the first and second rubber sheets 37, 47 in the present embodiment are located more to the outer side in the tire-radial direction than the tire-radial direction outside end 22A of the bead filler 22.

An RFID tag 40 is embedded as an electrical component in the tire 1 of the present embodiment. The RFID tag 40 is a passive transponder equipped with an RFID chip and an antenna for performing communication with external equipment, and performs wireless communication with a reader (not illustrated) serving as the external equipment. As the antenna, a coil-shaped spring antenna, plate-shaped antenna, and various types of rod-shaped antennas can be used. For example, it may be an antenna formed by printing a predetermined pattern on a flexible substrate. The antenna is established at an antenna length optimized according to the frequency band, etc. to be used. In a storage part inside the RFID chip, identification information such as a manufacturing number and part number is stored.

Figure 2:
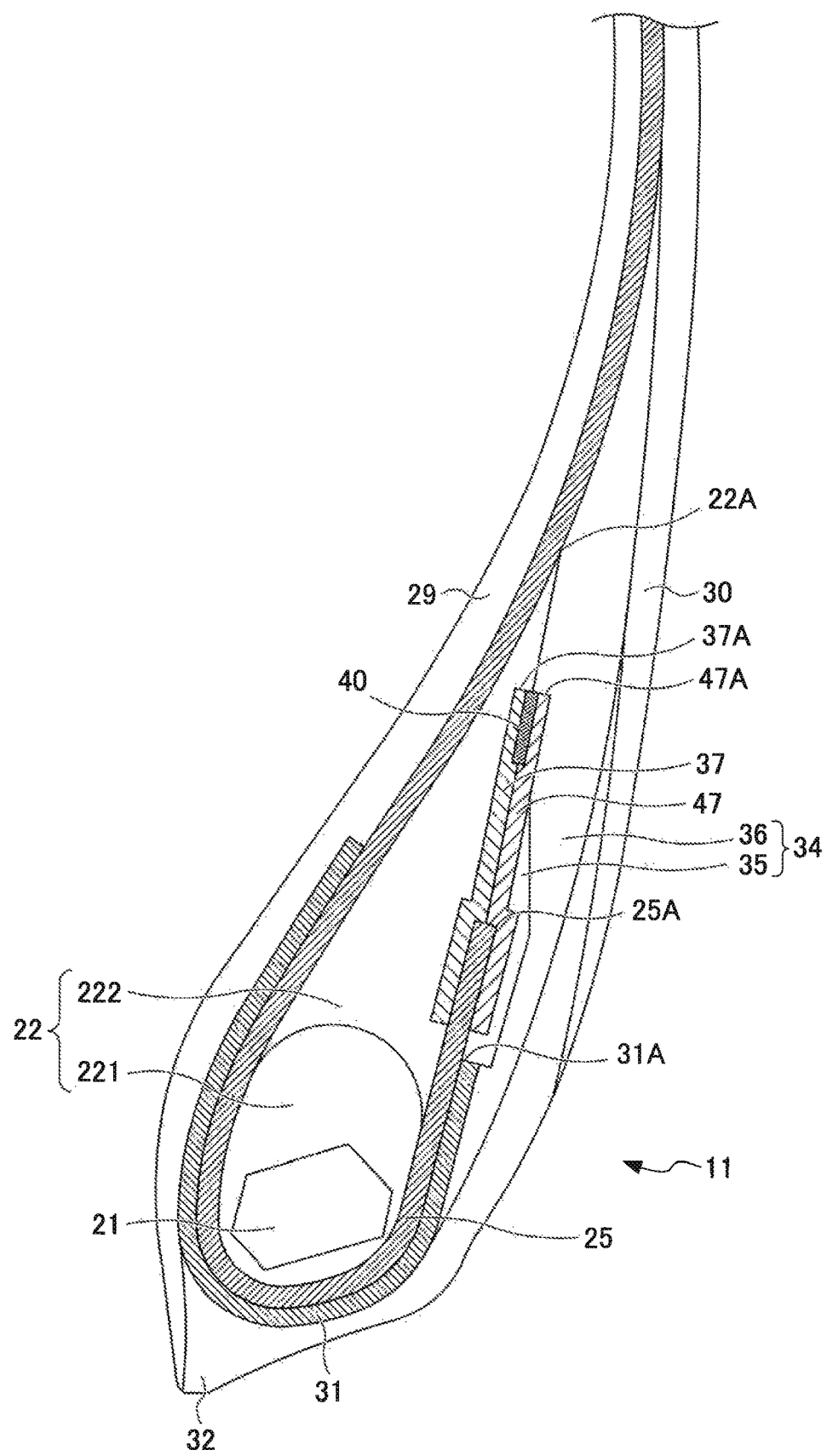
FIG. 2 is a partially enlarged cross-sectional view of a tire according to the first embodiment of the present invention.

FIG. 2 is an enlarged cross-sectional view showing the vicinity of an embedded part of the RFID tag 40 in the tire 1 of FIG. 1. As shown in FIGS. 1 and 2, the RFID tag 40 is arranged between the first rubber sheet 37 and second rubber sheet 47. Herein, the RFID tag 40 is covered by the coating rubber sheets 431, 432 which constitute the protective member 43 described later using FIG. 4. In the present embodiment, the coating rubber sheets 431, 432 covering the RFID tag 40 are arranged so that the tire-radial direction outside ends thereof substantially match with the tire-radial direction outside ends 37A, 47A of the first and second rubber sheets 37, 47, as shown in FIGS. 1 and 2. It is thereby possible to arrange the RFID tag 40 as much as possible to the outer side in the tire-radial direction.

It should be noted that, if establishing the modulus of the second pad 36 as a reference, the side-wall rubber 30 is preferably established with a modulus of 0.4 to 0.6 times that of the second pad 36. In addition, the first pad 35 is preferably established with a modulus of 1.1 to 1.2 times that of the second pad 36. In addition, the second bead filler 22 preferably established with a modulus of 0.7 to 0.8 times that of the second pad. By establishing such a modulus, it is possible to keep a balance of flexibility as a tire and rigidity in the vicinity of the bead 11.

Then, the first and second rubber sheets 37, 47 are preferably established with a modulus 1.1 times to 1.2 times that of the second pad 36. In other words, the modulus of the first and second rubber sheets 37, 47 preferably is established with substantially equal modulus to a portion of the pad member 34 having a high modulus (first pad 35). Alternatively, the modulus of the first and second rubber sheets 37, 47 may be set higher than the modulus of the pad member 34. In this way, the modulus of the first and second rubber sheets 37, 47 of the present embodiment is preferably established with a modulus of at least the modulus of the rubber member covering the surroundings. It thereby enters a state interposing the folding end 25A of the carcass ply 23 by the rubber members having high modulus, and becomes possible to effectively suppress the concentration of stress in the vicinity of the folding end 25A.

Then, in the present embodiment, since the RFID tag 40 is also arranged between the first rubber sheet 37 and second rubber sheet 47 which are rubber members of high modulus, the deformation amount of the RFID tag 40 becomes smaller even in a case of the tire 1 bending. Consequently, it is possible to appropriately protect the RFID tag 40.

It should be noted that the first and second rubber sheets 37, 47 play the role of reinforcing the region in which arranged, by absorbing the deformation of surrounding members, or the like, even in a case assuming the modulus thereof being smaller than the modulus of the rubber member which covers the surrounding. It should be noted that in a case of configuring the pad member 34 by one member, the modulus of the pad member 34 is set to be higher than a least the modulus of the side-wall rubber 30. Preferably, the modulus of the pad member 34 is set to be higher than the modulus of the side-wall rubber 30 and second bead filler 222. It should be noted that the modulus of the pad member 34 may be set equal to, or lower than, the modulus of the first and second rubber sheets 37, 47. It should be noted that the modulus indicates 100% elongation modulus (M100) under a 23° C. atmosphere, measured in accordance with "3.7 stress at a given elongation, S" of JIS K6251:2010.

As mentioned above, normally, in a case of the boundary surface of two substances being a surface extending from the folding end 25A of the carcass ply 23, distortion tends to occur at this surface. However, in the present embodiment, since the first and second rubber sheets 37, 47 are arranged so as to cover the folding end 25A of the carcass ply 23, more to the outer side in the tire-radial direction than the folding end 25A of the carcass ply 23 becomes a portion which hardly receives the influence of distortion.

Figure 3:
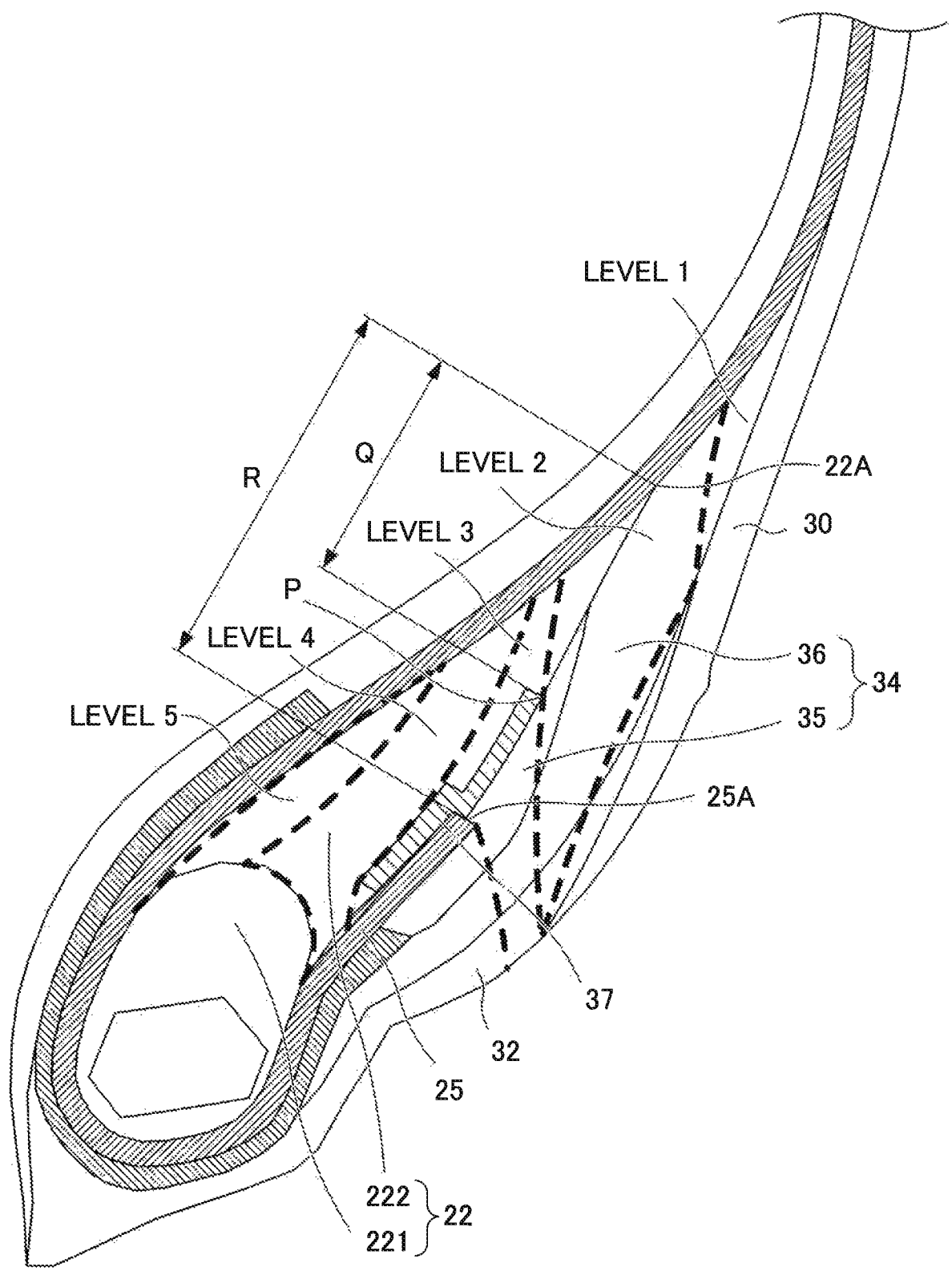
FIG. 3 is a view showing results of an in-plane distribution simulation of strain energy in a case of applying load to the tire.

FIG. 3 is a view showing the results of in-plane distribution simulation of strain energy, in a case of assembling the tire to a rim, and applying 100% load. The enlarged cross-sectional view shown in FIG. 3 displays by dividing the region in five, according to the magnitude of the strain energy. Herein, a region having the highest strain energy is defined as level 5, a region having high strain energy is defined as level 4, a region in which the strain energy somewhat declined is defined as level 3, a region in which the strain energy further declined is defined as level 2, and the region in which the strain energy declined the most is defined as level 1. FIG. 3 displays by dividing the regions with bold dotted lines as the boundary.

The region more to the outer side in the tire-radial direction than the folding end 25A of the carcass ply 23 at the boundary surface between the bead filler 22 and pad member 34 and vicinity thereof becomes a region of mostly level 2 to 3, and thus there is little strain energy. Consequently, upon arranging the RFID tag 40, this region is a preferable region. It should be noted that, in the present embodiment (refer to FIG. 2), although the second rubber sheet 47 is provided in addition to the first rubber sheet 37, since the basic configurations of arranging and reinforcing the rubber sheets are the same, the strain energy in the vicinity of the rubber sheet becomes equal to FIG. 3, or smaller.

It should be noted that, in the tire-width direction cross-sectional view shown in FIGS. 1 to 3, when defining the distance from the tire-radial direction outside end 22A of the bead filler 22 until the folding end 25A of the carcass ply 23 as a reference distance R, the RFID tag 40 is preferably arranged within a region (region Q) of range Q from the position of the tire-radial direction outside end 22A of the bead filler 22 until a position P (refer to FIG. 3) which is 60% of the reference distance towards the folding end 25A of the carcass ply 23. Within the region of this range Q, the strain energy of the boundary surface between the bead filler 22 and the pad member 34 and the vicinity thereof become mostly level 2, and upon arranging the RFID tag 40, becomes a very preferable region. Consequently, it is preferable to extend the first and second rubber sheets 37, 47 until this region, and arrange the RFID tag 40 in this region.

It should be noted that, so long as within the region of this range Q, it will be a position distanced a certain extent from the bead core 21 made of metal, which has a possibility of adversely affecting communication. Herein, the bead core 21 is formed in a ring shape by winding in layers of metal bead wires, and thus is a metal member having a particularly high possibility of adversely affecting communication. In addition, the vicinity of the first and second rubber sheets 37, 47 also hardly receive influence relative to external damage, due to being positions distanced a certain extent from the outer surface of the tire 1. Furthermore, since the outer side in the tire-width direction is protected by the pad member 34 having high modulus, it hardly receives influence relative to external damage also from this point.

Figure 4A:
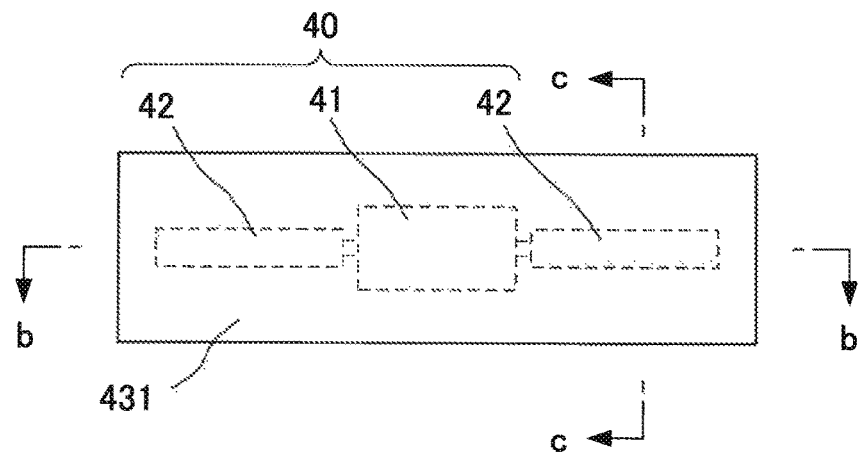
FIG. 4A is a view showing an RFID tag covered by a coating rubber sheet, in the tire according to the first embodiment of the present invention.
Figure 4B:
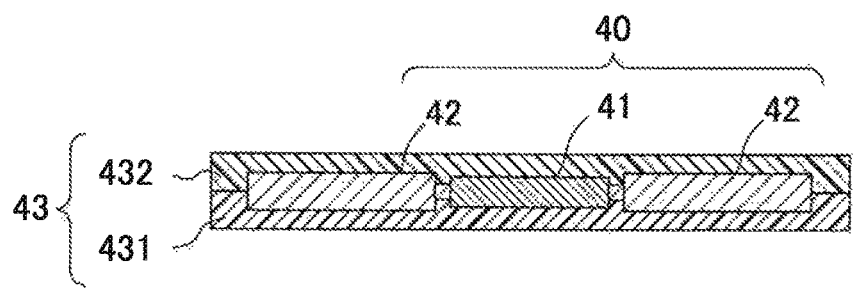
FIG. 4B is a view showing along the cross section b-b in FIG. 4A.
Figure 4C:
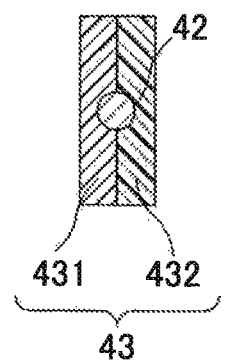
FIG. 4C is a view showing along the cross section c-c in FIG. 4A.

Herein, the RFID tag 40 is covered by the coating rubber sheets 431, 432 constituting the protective member 43. In other words, in the present embodiment, the protective member 43 is configured by the two coating rubber sheets 431, 432. This point will be explained while referencing FIGS. 4A to 4C. FIG. 4A is a view showing the RFID tag 40 covered by the coating rubber sheets constituting the protective member 43. In FIG. 4A, the RFID tag 40 is covered and hidden by the rubber sheet 431 described later. FIG. 4B is a cross-sectional view along the line b-b in FIG. 4A, and FIG. 4C is a cross-sectional view along the line c-c in FIG. 4A.

The RFID tag 40 includes an RFID chip 41 and antenna 42 for performing communication with external equipment. As the antenna 42, a coil-shaped spring antenna, plate-shaped antenna, and various types of rod-shaped antennas can be used. When considering the communicability and flexibility, a coil-shaped spring antenna is the most preferable.

As the rubber employed in the protective member 43, rubber of lower modulus than at least the first and second rubber sheets 37, 47 is used. For example, the coating rubber sheets 431, 432 constituting the protective member 43 are preferably established with a modulus of 0.5 to 0.8 times that of the first and second rubber sheets 37, 47. However, in order to impart a certain level of strength, it is preferable to use rubber of higher modulus than the side-wall rubber 30. More preferably, it is preferable to establish with a modulus substantially equal to the second bead filler 222. Alternatively, rubber of lower modulus than the second bead filler 222 may be used in consideration of effectively absorbing the deformation amount.

As mentioned above, by arranging the RFID tag 40 near the first and second rubber sheets 37, 47 having high modulus, even in the case of the tire 1 bending, it becomes possible to suppress the deformation amount at the peripheral part of the RFID tag 40. Furthermore, by covering the RFID tag 40 using the protective member 43 having low modulus, it becomes possible to absorb deformation of the first and second rubber sheets 37, 47 in the protective member 43, so as not to directly transmit to the RFID tag 40.

It should be noted that, the protective member 43 may be configured from a short-fiber filler mixed rubber. As the short-fiber filler, for example, it is possible to use insulating short fibers like organic short fibers such as aramid short fibers and cellulose short fibers; inorganic short fibers such as ceramic short fibers as in alumina short fiber, and glass short fiber. By mixing such short-fiber fillers into rubber, it is possible to raise the strength of the rubber. In addition, as the protective member 43, a coating rubber sheet in the vulcanized state may be used. The coating rubber sheet in a vulcanized state does not plastically deform as would raw rubber, and thus can appropriately protect the RFID tag 40.

In addition, as the protective member 43, an organic fiber layer from polyester fibers or polyamide fibers may be provided. It is also possible to embed an organic fiber layer in the two coating rubber sheets 431, 432.

Figure 5:
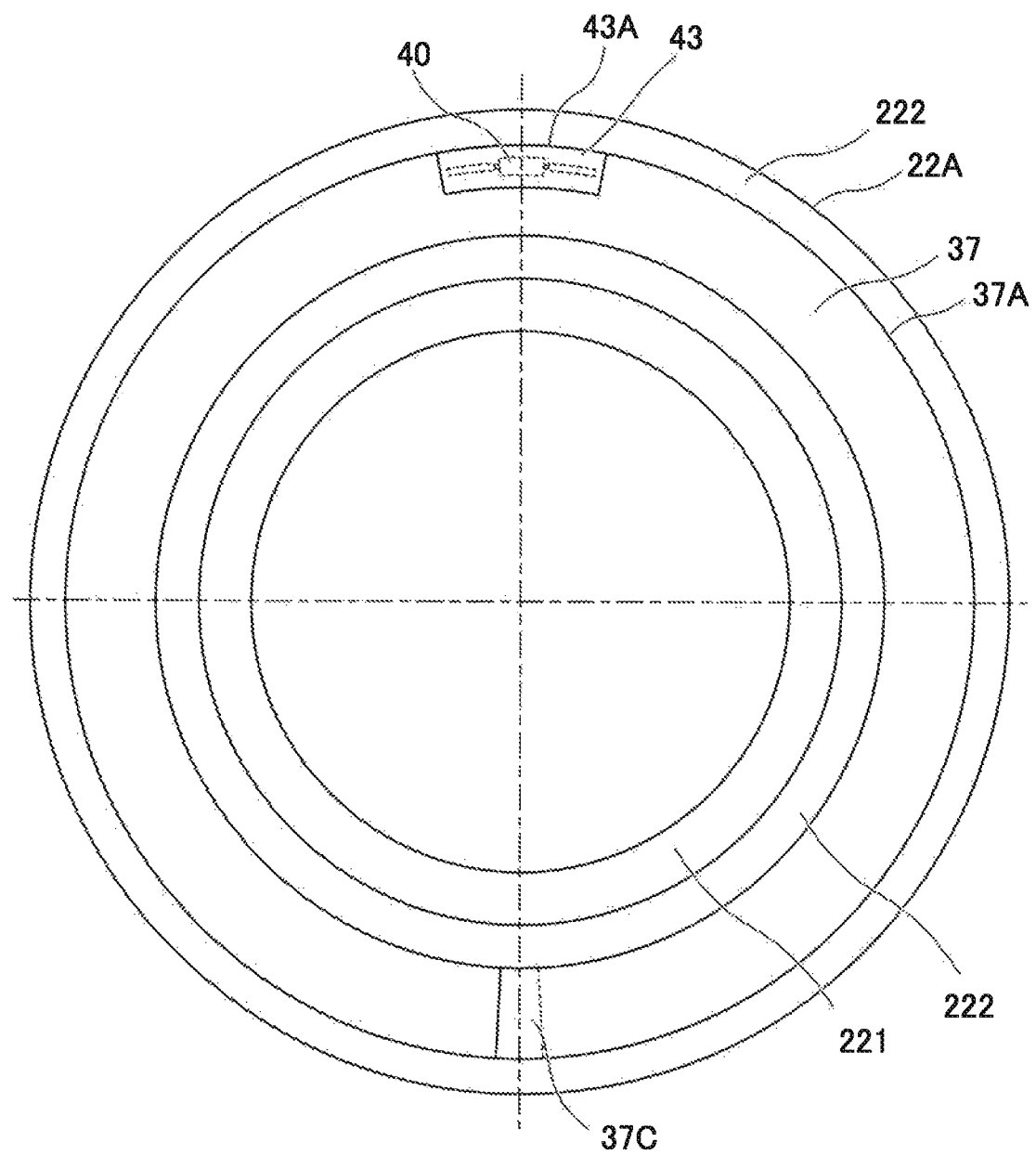
FIG. 5 is a view showing a state of pasting a first rubber sheet and the RFID tag covered by a coating rubber sheet of a tire according to the first embodiment of the present invention to the bead filler.

Next, the manufacturing process of the tire 1 will be explained. FIG. 5 is a view of the bead filler 22 in the manufacturing process when viewing from the outer side in the tire-width direction, and is a view showing a state of pasting the first rubber sheet 37 and RFID tag 40 covered by the protective member 43 to the bead filler 22. Herein, since the RFID tag 40 is covered by the protective member 43, it is illustrated by dotted line.

As shown in FIG. 5, the bead filler 22 constituting the bead 11 and the first rubber sheet 37 are respectively formed in an annular shape. Then, the first rubber sheet 37 has a joint part 37C. In the present embodiment, as shown in FIG. 5, the outside diameter of the outer circumference 37A of the first rubber sheet 37 (tire-radial direction outside end 37A in the tire-width direction cross-sectional view in FIG. 2) is somewhat smaller than the outside diameter of the outer circumference 22A of the bead filler 22 (tire-radial direction outside end 22A in the tire-width direction cross-sectional view of FIG. 2).

The RFID tag 40 covered by the protective member 43 serving as the coating rubber sheet is pasted prior to the vulcanization step in the manufacturing process of the tire 1. In the present embodiment, the first rubber sheet 37 is pasted to the bead filler 22 prior to being vulcanized. Subsequently, the RFID tag 40 covered by the protective member 43 is pasted to the first rubber sheet 37. Further thereafter, the second rubber sheet 47 which is not illustrated in FIG. 5 is pasted to the first rubber sheet 37, and the RFID tag 40 covered by the protective member 43 is interposed between the first rubber sheet 37 and second rubber sheet 47. At this time, the bead filler 22, and first and second rubber sheets 37, 47, due to being in the raw rubber state prior to vulcanization, can be pasted using the adhesiveness thereof. Alternatively, in the case of the adhesiveness being low or the like, it may be pasted using an adhesive or the like.

Each rubber member and the like constituting the tire is assembled in this way, whereby the green tire is formed. Subsequently, the green tire in which each constituent member including the RFID tag 40 is assembled is vulcanized in the vulcanization step to produce the tire.

It should be noted that the first and second rubber sheets 37, 47 are respectively formed in an annular shape, so as to assume a form covering the folding end 25A of the carcass ply 23 over the entire circumference in the state after green tire assembly. Consequently, it becomes possible to suppress the concentration of stress over the entire circumference. As a result thereof, the stress received by the RFID tag 40 also becomes smaller.

It should be noted that, as a modified example of the manufacturing process of the tire 1, the following such manufacturing process may be adopted. In other words, the RFID tag 40 covered by the protective member 43 is pasted to a side of the second rubber sheet 47, and subsequently, the first rubber sheet 37 and second rubber sheet 47 are pasted so that the RFID tag 40 covered by the protective member 43 is sandwiched between the first rubber sheet 37 and second rubber sheet 47. Even in a case of adopting such a process, the RFID tag 40 is arranged between the first rubber sheet 37 and the second rubber sheet 47.

In this way, in the present embodiment, using rubber in the raw rubber state during tire manufacture, since it is possible to paste the RFID tag 40 covered by the protective member 43, the assembly work of the RFID tag 40 in the manufacturing process of the tire is easy.

In addition, if configuring the protective member 43 by way of two coating rubber sheets 431, 432, since it is possible to thinly form the RFID tag 40 including the protective member 43, it is favorable upon embedding in the tire 1. In addition, when assembling the RFID tag 40 in the constituent members of the tire 1 prior to vulcanizing, the RFID tag 40 covered by the coating rubber sheet can be very easily installed. For example, at the desired position of members such as the first rubber sheet 37 prior to vulcanization, it is possible to appropriately paste the RFID tag 40 covered by the coating rubber sheets 431, 432 using the stickiness of raw rubber. In addition, by also establishing the coating rubber sheets 431, 432 as raw rubber prior to vulcanization, it is possible to more easily paste also using the stickiness of the rubber sheets themselves.

However, the protective member 43 can be employed in various forms, not limited to the form configured by two coating rubber sheets. For example, so long as the coating rubber sheet constituting the protective member covers at least part of the RFID tag 40, effects such as an improvement in workability during the manufacturing process and stress mitigation are obtained. In addition, for example, it may be a configuration wrapping one rubber sheet over the entire circumference of the RFID tag 40, or a configuration adhering a protective member in the form of a potting agent having high viscosity over the entire circumference of the RFID tag 40. Even if such a configuration, it is possible to appropriately protect the RFID tag 40.

It should be noted that the RFID tag 40 covered by the protective member 43 is embedded in the tire 1 so that the direction in which the antenna extends, i.e. longitudinal direction thereof, is the direction of a tangent line relative to the circumferential direction of the tire 1, i.e. direction orthogonal to the paper plane in the cross-sectional views of FIGS. 1 and 2, for example. In addition, the coating rubber sheets 431, 432 are embedded in the tire 1 in a form such that is aligned in the tire-width direction. In other words, in the manufacturing process, one side of either of the coating rubber sheets 431, 432 is pasted to a constituent member of the tire 1 prior to vulcanization, i.e. the first rubber sheet 37. Then, the RFID tag covered by the protective member 43 is arranged between the first rubber sheet 37 and second rubber sheet 47. By establishing such a form, stress hardly acts on the RFID tag 40 also when the tire deformed. In addition, the work for attaching the RFID tag 40 covered by the protective member 43 in the manufacturing process becomes simple.

Herein, in the attaching process of the RFID tag 40, by establishing the shape of the outer circumference 37A of the annular-shaped first rubber sheet 37 as a reference, it is possible to easily arrange the RFID tag 40 covered by the protective member 43 in the aforementioned direction. In other words, as shown in FIG. 5, the coating rubber sheets 431, 432 covering the RFID tag 40 are pasted so as to run along the circumferential direction of the outer circumference 37A of the annular-shaped first rubber sheet 37. At this time, as shown in FIG. 5, the coating rubber sheets 431, 432 formed by the raw rubber can also be pasted while deformed so as to run along the circumferential direction of the outer circumference 37A of the first rubber sheet 37. Using a flexible coil-shaped spring antenna or the like as the antenna of the RFID tag 40, a form such that the antenna also deforms following the deformation of the coating rubber sheets 431, 432 may be established. Alternatively, with the reference of the outer circumference of the annular-shaped first rubber sheet 37, the longitudinal direction of the coating rubber sheets 431, 432 covering the RFID tag 40 may be pasted so as to substantially match the tangential direction of the outer circumference of the annular-shaped first rubber sheet 37. By way of this method, it is possible to arrange the RFID tag 40 covered by the protective member 43 simply and accurately in the aforementioned direction, without giving special markers. In addition, the thickness of the bead when the tire is completed is also stable, and the variation in manufacture also decreases.

It should be noted that, upon pasting the coating rubber sheets 431, 432 while deforming so as to run along the outer circumference 37A of the first rubber sheet 37, it is preferable to make the outer circumference 37A of the first rubber sheet 37 and a side 43A in the longitudinal direction of the coating rubber sheets 431, 432 to substantially match. It is thereby possible to arrange the RFID tag 40 as much as possible to the outer side in the tire-radial direction, i.e. region in which strain energy is small. However, the side 43A in the longitudinal direction of the coating rubber sheets 431, 432 and the outer circumference 37A of the first rubber sheet 37 may be separated by a predetermined distance.

It should be noted that the RFID tag 40 is preferably interposed between the first rubber sheet 37 and second rubber sheet 47 in a state covered by the aforementioned such protective member 43; however, it may be interposed directly between the first rubber sheet 37 and the second rubber sheet 47, without covering by the protective member 43. So long as interposing the uncoated RFID tag 40 directly between the first rubber sheet 37 and the second rubber sheet 47, fluctuation in the thickness of the rubber member at the portion at which the RFID tag 40 is interposed decreases, and thus the uniformity of the tire improves. In addition, in the work of interposing the RFID tag 40 between the first rubber sheet 37 and the second rubber sheet 47, the removal of air also becomes easier by the amount decreasing the volume of the interposed object. In addition, the work time becomes shorter by there no longer being a step of covering the RFID tag 40 by a protective member.

It should be noted that, in the present embodiment, although the RFID tag 40 is embedded in the tire as an electronic component, the electronic component embedded in the tire is not limited to an RFID tag. For example, it may be various electronic components such as a sensor which carries out wireless communication. In addition, since the electronic component handles electrical information such as sending and receiving of electrical signals, there is a possibility of the performance declining due to metal components being present in the vicinity thereof. In addition, there is a possibility of the electronic component being damaged by excessive stress being applied. Consequently, even in the case of embedding various electronic components in a tire, it is possible to obtain the effects of the present invention. For example, the electronic component may be a piezoelectric element or strain sensor.

According to the tire 1 of the present embodiment, the following effects are exerted.

(1) The tire 1 according to the present embodiment includes: the bead core 21; the bead filler 22 extending to the outer side in the tire-radial direction of the bead core 21; the carcass ply 23 which extends from the bead core 21 to another bead core 21, and is folded back around the bead core 21; the first rubber sheet 37 which covers the folding end 25A of the carcass ply 23 which was folded back from the inner side in the tire-width direction; and the second rubber sheet 47 which covers the folding end 25A of the carcass ply 23 which was folded back from the outer side in the tire-width direction, in which the RFID tag 40 is provided between the first rubber sheet 37 and second rubber sheet 47. By the RFID tag 40 being interposed by rubber sheets from both sides, and being arranged at a position which hardly receives the influence of stress and distortion in the tire structure in this way, it is possible for the movement of the RFID tag 40 to be suppressed, and thus retain the function thereof.

(2) In the tire 1 according to the present embodiment, the first and second rubber sheets 37, 47 are both formed in an annular shape, and the annular-shaped first and second rubber sheets 37, 47 cover the folding end 25A of the carcass ply 23 over the entire circumference. It thereby becomes possible to suppress the stress occurring in the vicinity of the folding end 25A of the carcass ply 23 over the entire circumference. As a result thereof, the stress received by the RFID tag 40 also becomes smaller.

(3) In the tire 1 according to the present embodiment, the RFID tag 40 is covered by the coating rubber sheets 431, 432, and the RFID tag 40 covered by the coating rubber sheets 431, 432 is arranged between the first rubber sheet 37 and second rubber sheet 47. Consequently, it is possible to appropriately protect the RFID tag 40.

(4) In the tire 1 according to the present embodiment, the uncoated RFID tag 40 is arranged between the first rubber sheet 37 and second rubber sheet 47. By interposing the uncoated RFID tag 40 directly between the first rubber sheet 37 and second rubber sheet 47, the fluctuation in thickness of the rubber member at a portion at which interposing the RFID tag 40 decreases, and thus the uniformity of the tire improves. Consequently, the quality of the tire when completed also improves.

(5) In the tire 1 of the present embodiment, the modulus of the first and second rubber sheets 37, 47 is at least the modulus of the rubber member covering the circumference of the first and second rubber sheets 37, 47. By adopting a configuration interposed the folding end 25A of the carcass ply 23 by rubber members of high modulus in this way, it becomes possible to effectively suppress the concentration of stress at this portion. Then, since the RFID tag 40 is arranged to be sandwiched by the first and second rubber sheets 37, 47, which are rubber members of high modulus, the deformation amount of the RFID tag 40 becomes smaller even in a case of the tire 1 bending. Consequently, the RFID tag 40 is appropriately protected.

(6) In the tire 1 of the present embodiment, the modulus of the coating rubber sheets 431, 432 is lower than the modulus of the first and second rubber sheets 37, 47. By covering the RFID tag 40 by the coating rubber sheets 431, 432 of low modulus in this way, it becomes possible to absorb in the coating rubber sheets 431, 432 the deformation of the first and second rubber sheets 37, 47, and make it harder to transmit directly to the RFID tag 40.

(7) In the tire 1 of the present embodiment, when defining the distance from the tire-radial direction outside end 22A of the bead filler 22 until the folding end 25A of the carcass ply 23 which has been folded back as the reference distance R in the tire-width direction cross-sectional view, the RFID tag 40 is arranged in a region Q from a position of the tire-radial direction outside end 22A of the bead filler 22 until a position P 60% of the reference distance R towards the inner side in the tire-radial direction. Since the RFID tag 40 thereby comes to be arranged at a position at which distortion is smaller, the durability of the RFID tag 40 improves.

(8) The manufacturing method of the tire 1 according to the present embodiment includes a step of pasting the first rubber sheet 37 to the bead filler 22, and a step of overlapping the first rubber sheet 37 and second rubber sheet 47, in which the RFID tag 40 is pasted to the first rubber sheet 37 or second rubber sheet 47 prior to the step of overlapping, and the RFID tag 40 is interposed by the first rubber sheet 37 and second rubber sheet 47 in the step of overlapping. It is thereby possible to arrange the RFID tag 40 at a position which hardly receives the influence of stress and distortion in the tire structure.

Second Embodiment

Next, a tire according to a second embodiment will be explained while referencing FIGS. 6 and 7. It should be noted that the same reference symbol will be attached for the same configurations as the first embodiment in the following explanation, and detailed explanations thereof will be omitted.

Figure 6:
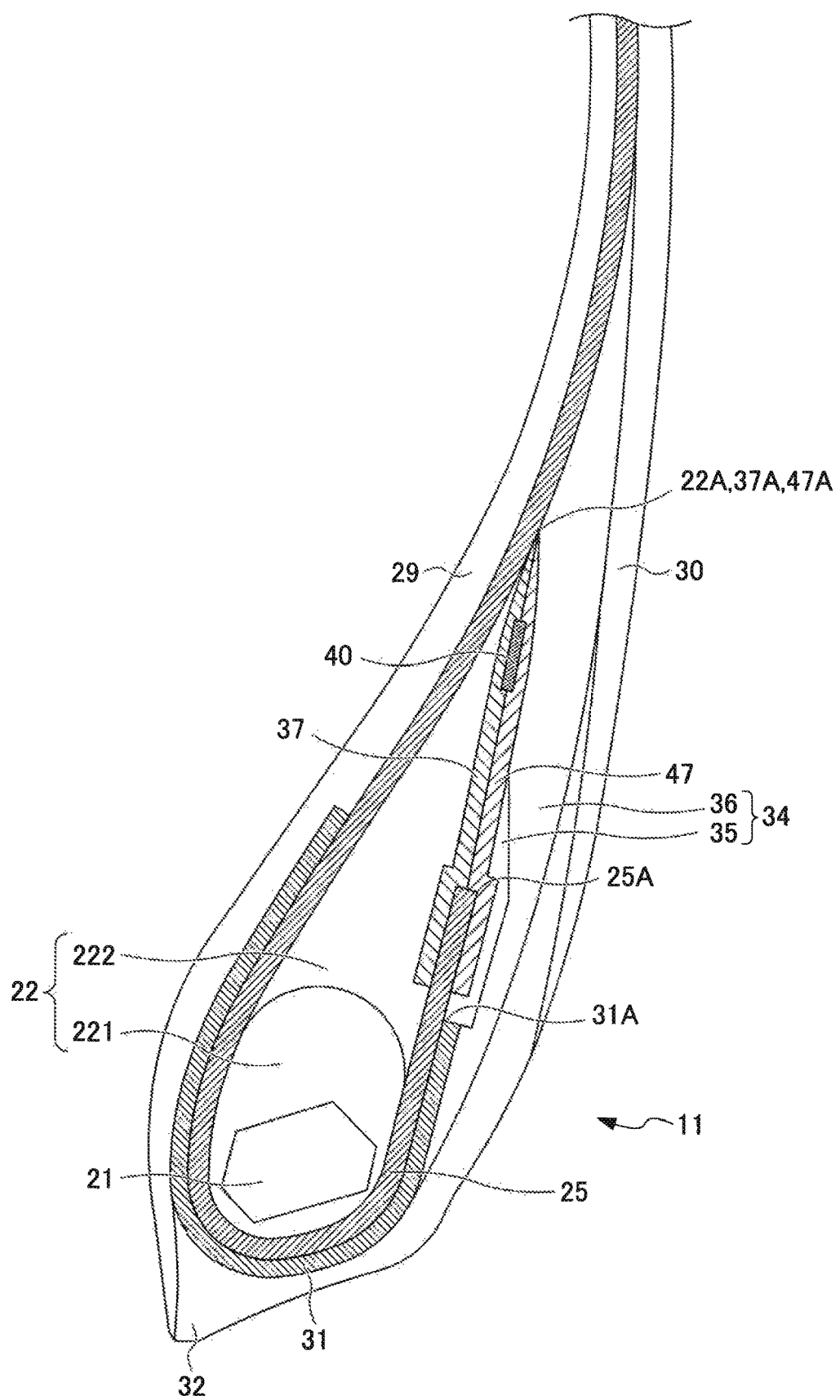
FIG. 6 is a partially enlarged cross-sectional view of a tire according to a second embodiment of the present invention.

FIG. 6 is a partially enlarged cross-sectional view of the tire according to the second embodiment. As shown in FIG. 6, in the present embodiment, the positions of the tire-radial direction outside ends 37A, 47A of the first and second rubber sheets 37, 47 are made to substantially match the position of the tire-radial direction outside end 22A of the bead filler 22.

Figure 7:
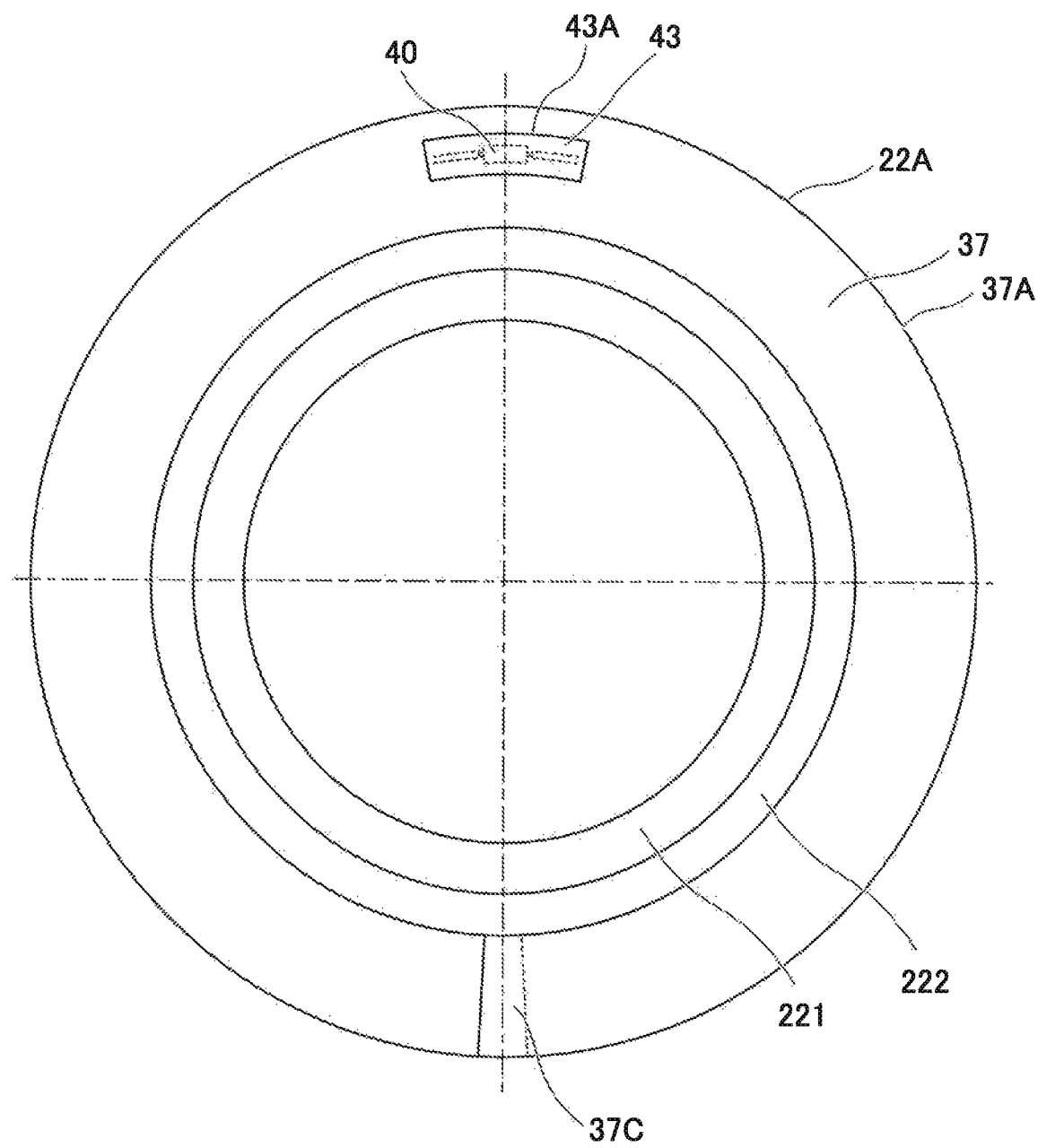
FIG. 7 is a view showing a state of pasting a first rubber sheet and the RFID tag covered by a coating rubber sheet of a tire according to the second embodiment of the present invention to the bead filler.

FIG. 7 is a drawing when viewing the bead filler 22 during the manufacturing process from an outer side in the tire-width direction, and shows a state pasting the first rubber sheet 37 and the RFID tag 40 covered by the protective member 43 to the bead filler 22. As shown in FIG. 7, the outside diameter of the outer circumference 37A of the annular-shaped first rubber sheet 37 (tire-radial direction outside end 37A in the tire-width direction cross-sectional view of FIG. 6) substantially matches the outside diameter of the outer circumference 22A of the bead filler 22 (tire-radial direction outside end 22A in the tire-width direction cross-sectional view of FIG. 2).

Next, the manufacturing process of the present embodiment will be explained. In the present embodiment, first, the first rubber sheet 37 is pasted to the bead filler 22 prior to being vulcanized. At this time, both outer circumferences 22A, 37A are pasted so as to substantially match. Subsequently, the RFID tag 40 covered by the protective member 43 is pasted to the first rubber sheet 37. At this time, the coating rubber sheets 431, 432 of the protective member 43 are pasted to be separated by a predetermined distance from the outer circumference 37A of the first rubber sheet 37. Further thereafter, the second rubber sheet 47 which is not illustrated in FIG. 7 is pasted to the first rubber sheet 37. At this time, both outer circumferences 37A, 47A are pasted so as to substantially match. By configuring in this way, the RFID tag 40 covered by the protective member 43 is interposed between the first rubber sheet 37 and second rubber sheet 47.

According to the present embodiment, the outer circumferential edges of the annular-shaped first rubber sheet 37, annular-shaped rubber sheet 47 and annular-shaped bead filler 22 substantially match. Consequently, since the RFID tag 40 covered by the protective member 43 is firmly covered by the first and second rubber sheets 37, 47, it is possible to effectively suppress movement of the RFID tag 40 even in a case of the tire 1 bending. In addition, during molding and vulcanization in the manufacturing process of the tire 1, it is possible to suppress movement of the RFID tag 40. Additionally, so long as being the configuration of the present embodiment, it is possible to arrange the RFID 40 as much as possible to the outer side in the tire-radial direction, i.e. region in which strain energy is small. In addition, since the tire-radial direction outside ends 37A, 47A of the first and second rubber sheets 37, 47 are no positioned at the middle of the interface between the bead filler 22 and pad member 34, there is no longer a level difference in the middle of the interface between the bead filler 22 and pad member 34, and thus the uniformity of the tire 1 also improves.

According to the tire related to the present embodiment, the following effects are exerted in addition to the above-mentioned (1) to (8).

(9) The bead filler 22 of the present embodiment is formed in an annular-shape, and the outer circumferential edges of the annular-shaped first rubber sheet 37, annular-shaped second rubber sheet 47, and annular-shaped bead filler 22 substantially match. Since it is thereby possible to firmly cover the RFID tag 40 by the annular-shaped first rubber sheet 37 and second rubber sheet 47, movement in the tire-radial direction, etc. of the RFID tag 40 can be further suppressed, and the durability of the RFID tag 40 improves.

Third Embodiment

Figure 8:
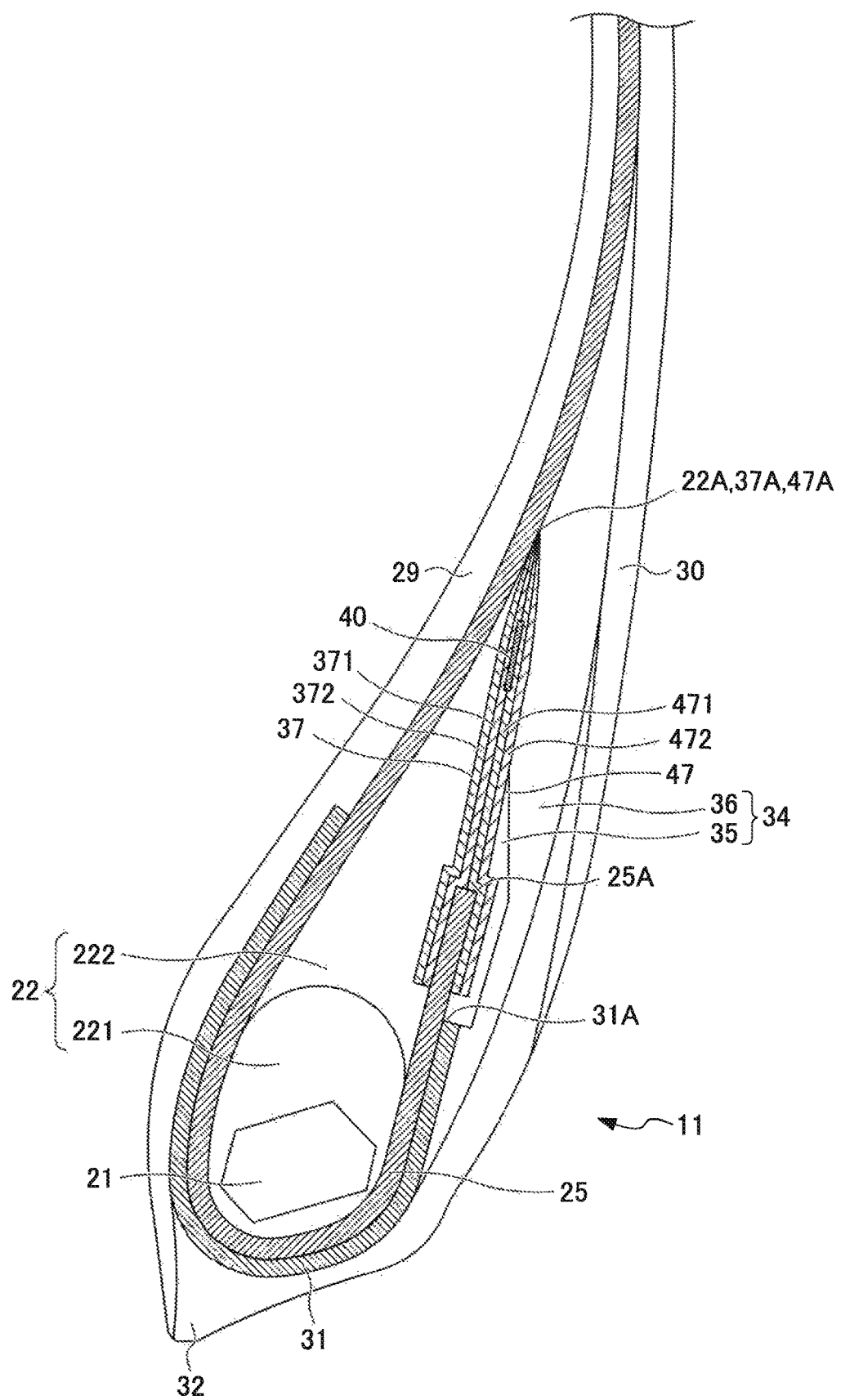
FIG. 8 is a partially enlarged cross-sectional view of a tire according to a third embodiment of the present invention.

Next, a tire according to a third embodiment will be explained while referencing FIG. 8. It should be noted that the same reference symbol will be attached for the same configurations as the second embodiment in the following explanation, and detailed explanations thereof will be omitted.

In the present embodiment, the first and second rubber sheets 37, 47 are respectively formed by a plurality of layers. More specifically, the first rubber sheet 37 includes an interior layer 371 on a side facing the RFID tag 40, and an outer layer 372 positioned on a side more distanced from the RFID tag 40 than the interior layer 371. Then, the modulus of the interior layer 371 is lower than the modulus of the outer layer 372. In addition, the second rubber sheet 47 includes an interior layer 471 on a side facing the RFID tag 40, and an outer layer 472 positioned on a side more distanced from the RFID tag 40 than the interior layer 471. Then, the modulus of the interior layer 471 is lower than the modulus of the outer layer 472. Since the modulus of the rubber member is set so as to become lower as approaching the RFID tag 40 in this way, it is possible to appropriately protect the RFID tag 40.

In other words, due to the existence of the outer layers 372, 472 of relatively high modulus, it becomes possible to suppress the deformation amount of the peripheral part of the RFID tag 40, even in a case of the tire 1 bending. Furthermore, due to the existence of the interior layers 371, 471 of relatively low modulus, it becomes possible to absorb in the interior layers 371, 471 the deformation occurring at the surroundings.

It should be noted that it is preferable for the modulus of the outer layer 372 to be established as a modulus of 1.1 times to 1.2 times that of the second pad 36. In other words, the modulus of the outer layer 372 is preferably established as a modulus substantially equal to the modulus of a portion (first pad 35) at least covering the folding end 25A of the carcass ply 23 in the pad member 34. It should be noted that it is preferable for the modulus of the interior layer 371 to be established as a modulus substantially equivalent to the second bead filler 222. Alternatively, rubber of lower modulus than the second bead filler 222 may be used in consideration of effectively absorbing the deformation amount.

It should be noted that the technique of using the first and second rubber sheets 37, 47 formed by a plurality of layers can also be applied to the first embodiment. In addition, each of the first and second rubber sheets 37, 47 only need to include at least two layers having the functions of the aforementioned interior layer and outer layer, and may be formed by three or more layers, for example.

According to the tire related to the present embodiment, the following effects are exerted in addition to the above-mentioned (1) to (9).

(10) The first and second rubber sheets 37, 47 of the present embodiment respectively include the interior layers 371, 471 on a side facing the RFID tag 40, and the outer layers 372, 472 positioned on a side more distanced from the RFID tag 40 than the interior layers 371, 471, and the modulus of the interior layers 371, 471 is lower than the modulus of the outer layer 372, 472. Due to the existence of the outer layers 372, 472 of relatively high modulus, it thereby becomes possible to suppress the deformation amount in the peripheral part of the RFID tag 40, even in a case of the tire 1 bending. Furthermore, due to the existence of the interior layers 371, 471 of relatively low modulus, it becomes possible to absorb in the interior layers 371, 471 the deformation occurring at the surroundings. Consequently, it is possible to appropriately protect the RFID tag 40.

Fourth Embodiment

Next, a tire according to a fourth embodiment will be explained while referencing FIGS. 9 to 15. It should be noted that the same reference symbol will be attached for the same configurations as the first embodiment in the following explanation, and detailed explanations thereof will be omitted. The present embodiment is a particularly favorable embodiment in the case of the antenna of the RFID tag 40 being a coil-shaped spring antenna.

In the RFID tag 40 of the present embodiment, a coil-shaped spring antenna 421 having high communicability and flexibility can be used as the antenna. The spring antenna 421 is set to an antenna length which was optimized according to the frequency band, etc. to be used.

In the present embodiment, prior to interposing the RFID tag 40 by the two coating rubber sheets 431, 432 constituting the protective member 43, the rubber is arranged within the spring antenna 421. More preferably, rubber is filled into the spring antenna, so that air will not remain as much as possible. This process and the reason for adopting this process will be explained using FIGS. 9 to 15.

Figure 9:
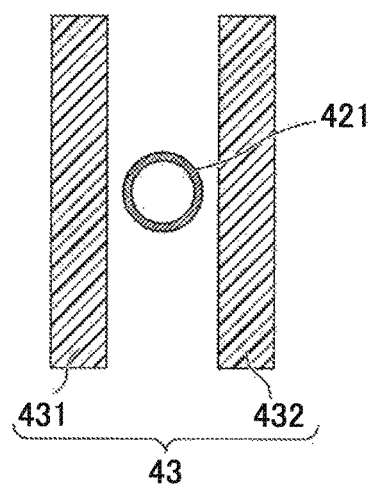
FIG. 9 is a view showing a cross section prior to interposing the RFID tag by the coating rubber sheets, in a case of not filling rubber into a spring antenna.
Figure 10:
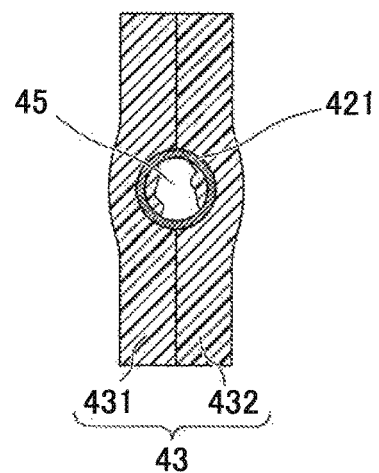
FIG. 10 is a view showing a cross section after interposing the RFID tag by coating rubber sheets, in a case of not filling rubber into a spring antenna.

First, a state of the surroundings of the RFID tag 40 in a case of not filling rubber into the spring antenna 421 will be explained as a reference example using FIGS. 9 to 11. FIG. 9 is a view showing a cross section of the spring antenna 421, and coating rubber sheets 431, 432, prior to interposing the RFID tag 40 by the coating rubber sheets 431, 432. FIG. 10 is a view showing a cross section of the spring antenna 421, and coating rubber sheets 431, 432, after interposing the RFID tag 40 by the coating rubber sheets 431, 432.

As shown in FIG. 10, in this reference example, since rubber is not filled into the spring antenna 421 in advance, a certain amount of air 45 may remain within the spring antenna 421 after interposing by the coating rubber sheets 431, 432. If air remains in this way, the integrity of the coating rubber sheets 431, 432 and the spring antenna 421 becomes insufficient, and when the tire deforms, there is concern over the spring antenna 421 not following the motion of the rubber, and the RFID tag 40 having the spring antenna 421 being damaged.

It should be noted that raw rubber before vulcanization is used as the coating rubber sheets 431, 432 herein. Consequently, by pushing the coating rubber sheets 431, 432 from both sides, the coating rubber sheets 431, 432 sticks to some extent inside the spring antenna as shown in FIG. 10. However, very large amounts of time and labor are required in order to stick the coating rubber sheets 431, 432 until the inside of the spring antenna is completely embedded.

Figure 11:
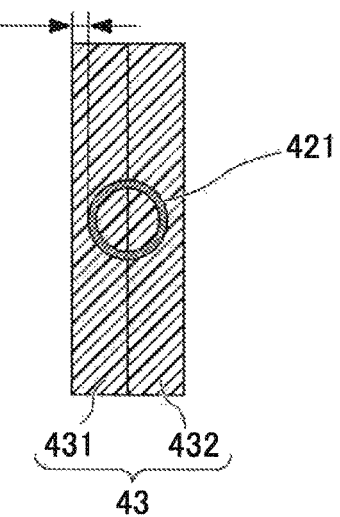
FIG. 11 is a view showing a cross section after interposing the RFID tag by coating rubber sheets, in a case of not filling rubber into a spring antenna.

Then, even if assuming a case of taking time and sticking the coating rubber sheets until the inside of the spring antenna is embedded, the distance L between the outer circumferential part of the spring antenna 421 and the outer surface of the coating rubber sheets 431, 432 becomes very short, as shown in FIG. 11. In addition, it is difficult to stabilize this distance L, and locally thin portions can occur. Consequently, the protection of the RFID tag 40 by the coating rubber sheets 431, 432 becomes insufficient, and during vulcanization, there is a possibility of the coating rubber sheets 431, 432 being damaged.

Therefore, in the present embodiment, prior to interposing the RFID tag 40 by the coating rubber sheets 431, 432, the rubber is arranged within the spring antenna 421, as shown in FIGS. 12 to 15. More preferably, rubber is filled within the spring antenna so that air does not remain as much as possible. It should be noted that the views shown on the right sides of FIGS. 12 to 15 are views showing a transverse section of the spring antenna 421 and the surrounding thereof.

Figure 12:
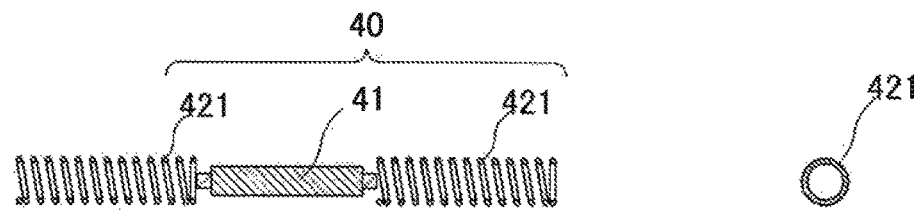
FIG. 12 is a view showing the RFID tag prior to filling rubber inside a spring antenna in a tire according to a fourth embodiment of the present invention.
Figure 13:
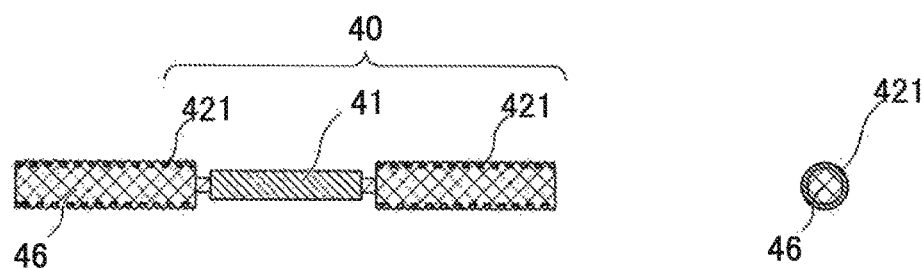
FIG. 13 is a view showing the RFID tag after filling rubber inside a spring antenna in a tire according to the fourth embodiment of the present invention.

FIG. 12 is a view showing a state prior to filling the rubber 46 into the spring antenna 421, and FIG. 13 is a view showing a state after filling the rubber 46 into the spring antenna 421. The rubber 46 is embedded so as to be almost the same outside diameter as the outer circumferential face of the spring antenna 421. Then, in the case of the rubber 46 escaping from the outer circumferential face of the spring antenna 421, it is preferable to wipe off this portion. In other words, the outer circumferential face of the rubber 46 is preferably molded so as to become substantially the same surface as the outer circumferential face of the spring antenna 421. It should be noted that the rubber 46 may be filled into the spring antenna 421, and the outer circumference of the spring antenna 421 may be thinly wrapped by the rubber 46. On the other hand, if thickly wrapping the spring antenna 421 by the rubber 46, in addition to the flexibility of the spring antenna 421 being harmed, the dimension in the width direction formed by the coating rubber sheets 431, 432 after interposing the RFID tag 40 becomes larger, which is not preferable. It should be noted that the rubber 46 may be embedded so as to become substantially the same outside diameter as the inner circumferential face of the spring antenna 421. It is desirable for the outer circumferential part of the rubber 46 to be located within the range of the inner circumferential face and outer circumferential face of the spring antenna 421.

Herein, rubber having flexibility is used as the rubber 46 in order to ensure the flexibility of the spring antenna 421. However, it is preferable to use rubber of a modulus higher than the coating rubber sheets 431, 432 as the rubber 46, in consideration of the workability, etc. It should be noted that preferably unvulcanized rubber is used as the rubber 46 arranged within the spring antenna 421. By establishing the rubber 46 and coating rubber sheets 431, 432 as unvulcanized rubber and vulcanizing simultaneously, the integrity of the rubber 46, coating rubber sheets 431, 432 and spring antenna 421 rises. In addition, the rubber 46, and coating rubber sheets 431, 432 are more preferably established as the same type of rubber. It should be noted that, by emphasizing the flexibility of the spring antenna 421, rubber of lower modulus than the coating rubber sheets 431, 432 may be used as the rubber 46. In addition, rubber of substantially the same modulus, and rubber of the same material may be used. It should be noted that vulcanized rubber may be used as the rubber 46 arranged within the spring antenna 421. In addition, rubber-based adhesive, rubber-based filler, etc. can also be used. Taking account of configuring so as not to leave air within the spring antenna 421 as much as possible, while ensuring flexibility, it is possible to adopt various rubber-based materials. As the arranging operation of the rubber 46, various methods can be adopted; however, for example, it is also possible to inject rubber into the spring antenna 421 using a syringe. In this case, a set appropriate amount of the rubber 46 may be filled using a syringe. In addition, after filling a large amount of the rubber 46, portions protruding from the outer circumference of the spring antenna 421 may be wiped off.

Figure 14:
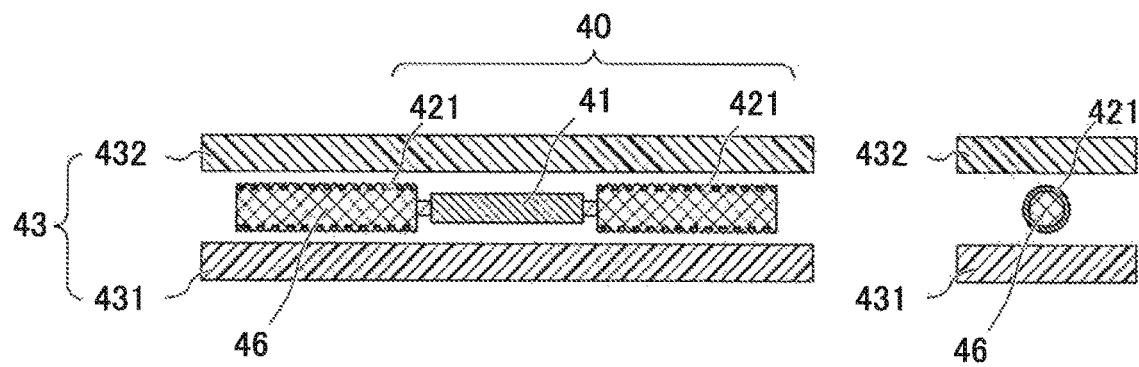
FIG. 14 is a view showing the RFID tag prior to interposing by coating rubber sheets, in a tire according to the fourth embodiment of the present invention.
Figure 15:
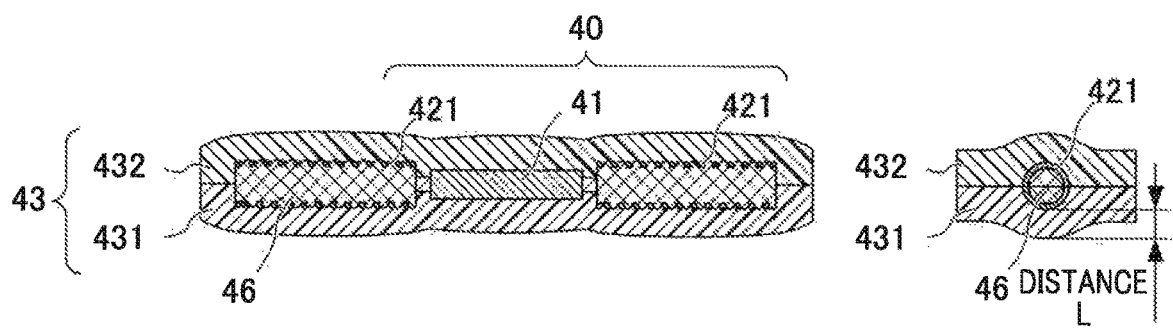
FIG. 15 is a view showing the RFID tag interposed by a coating rubber sheet, in a tire according to the fourth embodiment of the present invention.

FIG. 14 is a view showing a state prior to interposing the RFID tag 40 into which the rubber 46 is filled in the spring antenna 421, by the coating rubber sheets 431, 432, and FIG. 15 is a view showing a state after interposing by the coating rubber sheets 431, 432.

As shown in FIG. 15, according to the present embodiment, since the rubber 46 is filled in advance into the spring antenna 421, no air pockets exist between the coating rubber sheets 431, 432. Consequently, since it is unnecessary to be concerned over air pockets, the process of interposing the RFID tag 40 by the coating rubber sheets 431, 432 also becomes easy. In addition, by the rubber 46 being arranged within the spring antenna 421, the integrity of the spring antenna 421, rubber 46, and coating rubber sheets 431, 432 rises, and when the tire deforms, the spring antenna 421 follows the movement of the rubber. Consequently, the durability of the RFID tag 40 having the spring antenna 421 also improves.

In addition, according to the present embodiment, the distance L between the outer circumferential part of the spring antenna 421 and the outer circumferential face of the coating rubber sheets 431, 432 stabilizes. In other words, a distance close to the thickness of the coating rubber sheets 431, 432 is generally secured as this distance L. Consequently, the RFID tag 40 is sufficiently protected by the coating rubber sheets 431, 432. In the present embodiment, the RFID tag 40 interposed by the coating rubber sheets 431, 432 is fixedly set up at the bead filler 22, etc., and subsequently, the green tire is vulcanized.

It should be noted that, in the present embodiment, the RFID tag 40 into which the rubber 46 was filled in advance within the spring antenna 421 is arranged so as to be sandwiched between the first rubber sheet 37 and second rubber sheet 47 upon being covered by the coating rubber sheets 431, 432. However, the RFID tag 40 in which the rubber 46 was filled in advance into the spring antenna 421 may be interposed directly between the first rubber sheet 37 and second rubber sheet 47, without covering by the coating rubber sheets 431, 432. By interposing the uncoated RFID tag 40 directly between the first rubber sheet 37 and second rubber sheet 47, the fluctuation in thickness of the rubber member at a portion interposing the RFID tag 40 decreases, and thus the uniformity of the tire improves. In addition, since the rubber 46 is filled into the spring antenna 421 in advance, the first rubber sheet 37 and/or second rubber sheet 47 will not excessively sink into the spring antenna.

According to the tire related to the present embodiment, the following effects are exerted in addition to the above-mentioned (1) to (10).

(11) A manufacturing method of the tire 1 according to the present embodiment includes a step of arranging the rubber 46 into the spring antenna 421, the RFID tag 40 having the spring antenna 421, and in a step of superimposing the first rubber sheet 37 and the exposed portion of the second rubber sheet 47, the RFID tag 40 having the spring antenna 421 in which the rubber 46 is arranged is interposed by the first rubber sheet 37 and second rubber sheet 47. Upon the step of interposing the spring antenna 421 of the RFID tag 40 between rubber members, since it becomes unnecessary to be concerned over air pockets, the assembly property becomes favorable.

(12) The present embodiment provides a step of arranging the rubber 46 within the spring antenna 421 of the RFID tag 40 serving as an electronic component having a communication function; a step of interposing the RFID tag 40 having the spring antenna 421 into which the rubber 46 was arranged, by the coating rubber sheets 431, 432, and an arrangement step of arranging the RFID tag 40 interposed by the coating rubber sheets 431, 432 between the first rubber sheet 37 and second rubber sheet 47. The air 45 will thereby not remain inside the spring antenna 421. In addition, since it is unnecessary to be concerned about air pockets, the work of interposing the RFID tag 40 by the coating rubber sheets 431, 432 also becomes easy. In addition, since the distance L between the outer circumferential part of the spring antenna 421 and the outer surface of the rubber sheets 431, 432 is stabilized, the RFID tag 40 is sufficiently protected by the coating rubber sheets 431, 432.

(13) The present embodiment includes: a step of arranging the rubber 46 within the spring antenna 421 of the RFID tag 40 serving as an electronic component having a communication function; and a step of pasting the first rubber sheet and the second rubber sheet so as to interpose the uncoated RFID tag 40 between the first rubber sheet 37 and second rubber sheet 47. By interposing the uncoated electronic component directly between the first rubber sheet 37 and second rubber sheet 47, the fluctuation in thickness of the rubber member at the portion interposing the RFID tag 40 decreases, and thus the uniformity of the tire improves. In addition, since the rubber 46 is filled in advance into the spring antenna 421, the first and second rubber sheets 37, 47 will not excessively sink into the spring antenna.

It should be noted that, although the tire of the present invention can be adopted as various types of tires such as for cars, light trucks, trucks and buses, it is particularly suitable as a tire of a truck, bus, etc. It should be noted that the present invention is not to be limited to the above-mentioned embodiments, and that even when carrying out modifications, improvements, etc. within a scope capable of achieving the object of the present invention, it is encompassed by the scope of the present invention.

What is claimed is:

1. A tire, comprising:
    a bead core;
    a bead filler which extends to an outer side in a tire-radial direction of the bead core;
    a carcass ply which extends from the bead core to another bead core, and is folded back around each bead core;
    a first rubber sheet covering an inner side in a tire-width direction of a folding end of the carcass ply which has been folded back; and
    a second rubber sheet covering an outer side in the tire-width direction of the folding end of the carcass ply which has been folded back,
    wherein an electronic component is provided between the first rubber sheet and the second rubber sheet, the first rubber sheet and the second rubber sheet each include an interior layer on a side facing the electronic component and an outer layer positioned on a side further distanced from the electronic component than the interior layer, and a modulus of the interior layer is lower than a modulus of the outer layer.

2. The tire according to claim 1, wherein the first rubber sheet and the second rubber sheet are both formed in an annular shape, and the first rubber sheet and the second rubber sheet cover the folding end of the carcass ply over an entire circumference thereof.

3. The tire according to claim 2, wherein the bead filler is formed in an annular shape, and wherein outer circumferential edge parts of the first rubber sheet, the second rubber sheet and the bead filler substantially match.

4. The tire according to claim 1, wherein the electronic component is covered by a coating rubber sheet, and the electronic component covered by the coating rubber sheet is disposed between the first rubber sheet and the second rubber sheet.

5. The tire according to claim 4, wherein a modulus of the coating rubber sheet is lower than a modulus of the first rubber sheet and the second rubber sheet.

6. The tire according to claim 1, wherein the electronic component in an uncoated state is disposed between the first rubber sheet and the second rubber sheet.

7. The tire according to claim 1, wherein a modulus of the first rubber sheet and the second rubber sheet is equal to or higher than a modulus of a rubber member covering a circumference of the first rubber sheet and the second rubber sheet.

8. The tire according to claim 1, wherein, when defining a distance in the tire-width direction and a cross-sectional view from the tire-radial direction of an outside end of the bead filler until the folding end of the carcass ply is folded back as a reference distance, the electronic component is disposed in a region from the tire-radial direction of the outside end of the bead filler until a position that is 60% of the reference distance toward the inner side in the tire-radial direction.

* * * * *